United States Patent [19]

Church

[11] Patent Number: 4,773,769
[45] Date of Patent: Sep. 27, 1988

[54] SLIDE STRUCTURE AND METHOD OF ASSEMBLY THEREOF

[75] Inventor: Jerrald W. Church, Charleston, N.H.

[73] Assignee: Jones & Lamson Precision Optical Co., Inc., Springfield, Vt.

[21] Appl. No.: 900,283

[22] Filed: Aug. 25, 1986

[51] Int. Cl.$^4$ .................................... F16C 29/02
[52] U.S. Cl. ...................................... 384/42; 384/40
[58] Field of Search ............ 384/7, 10, 17, 23, 38–42

[56] References Cited

U.S. PATENT DOCUMENTS

| | | | |
|---|---|---|---|
| 99,149 | 1/1870 | Burke | 384/39 |
| 2,182,019 | 12/1939 | Eisele | 384/15 |
| 2,453,875 | 11/1948 | Terhune | 384/40 |
| 2,504,347 | 4/1950 | O'Donnell | 384/42 |
| 2,512,842 | 6/1950 | Szubzda | 384/38 |
| 2,548,712 | 4/1951 | Firmin | 384/10 |
| 2,581,022 | 1/1952 | Japikse | 384/39 |
| 2,581,602 | 1/1952 | Pulsifer | 384/39 |
| 3,054,645 | 9/1962 | Evans | 384/42 |
| 3,782,790 | 1/1974 | Benkowski | 384/39 X |

FOREIGN PATENT DOCUMENTS

| | | | |
|---|---|---|---|
| 447144 | 11/1949 | Italy | 384/10 |
| 816050 | 7/1959 | United Kingdom | 384/40 |

*Primary Examiner*—Stuart S. Levy
*Assistant Examiner*—Thomas R. Hannon
*Attorney, Agent, or Firm*—Nicholas L. Coch; Walter G. Marple, Jr.

[57] ABSTRACT

A slide structure having an elongated slide body having a pair of outwardly convergent continuous slide surfaces at each side thereof which are supported within longitudinally spaced pairs of vee blocks which vee blocks are carried by a base member. The vee blocks at each side of the slide body are pivotable with the vee blocks at one side being selectively biased to provide a selectable preload between the vee blocks and the slide body.

6 Claims, 2 Drawing Sheets

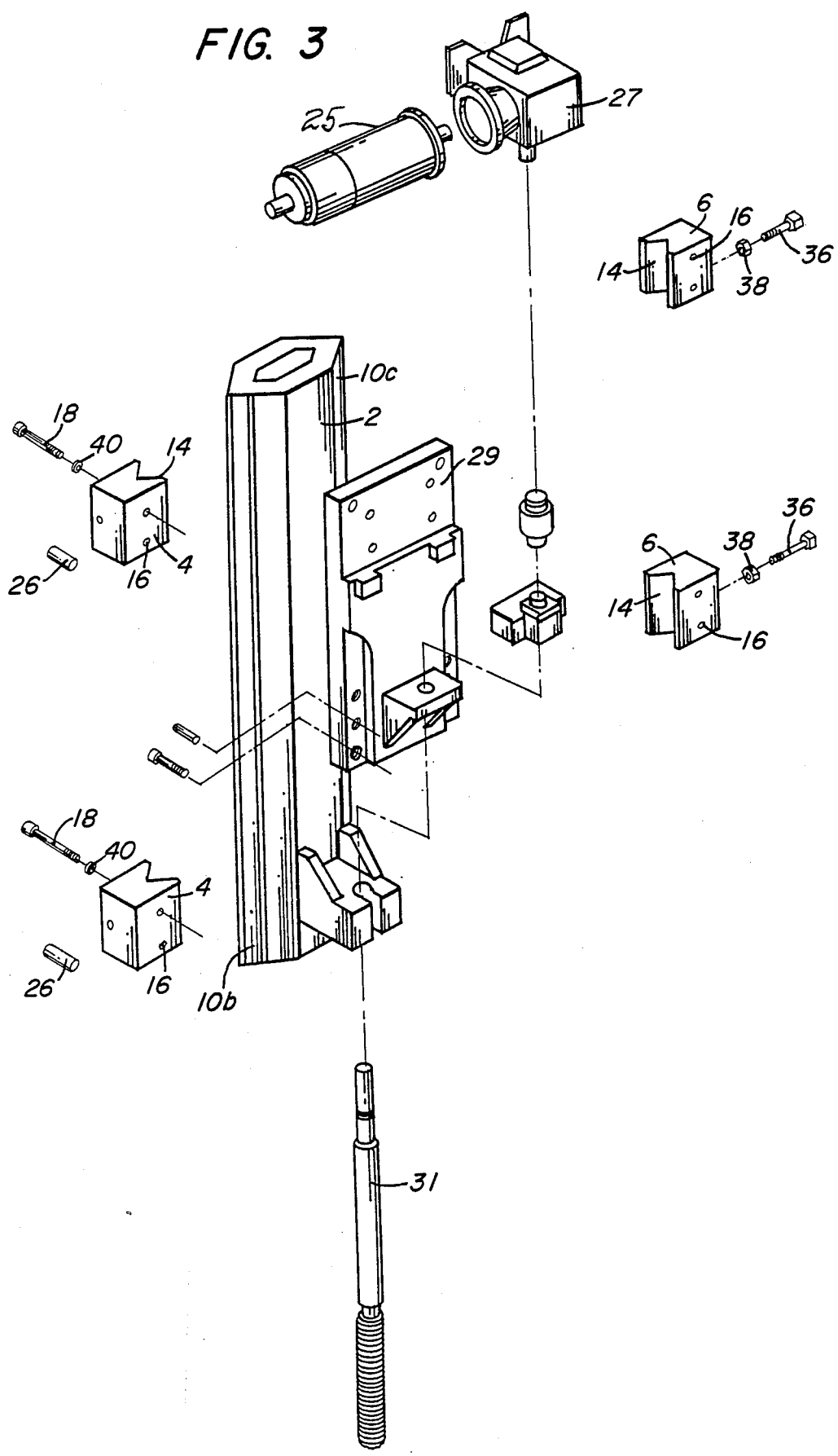

SLIDE STRUCTURE AND METHOD OF ASSEMBLY THEREOF

BACKGROUND OF THE INVENTION

In various machines it is desirable to provide a slide structure which can move relative to a supporting member in a straight line on a selectively repeatable basis. Although there are various types of slide structures, the slide structure and method of this invention was developed for use on optical comparators and, accordingly, such a device is described herein in conformity with the patent statutes. One prior slide structure for an optical comparator comprises an elongated spindle having an elongated portion slidably received within spaced bores on a stationary member and a threaded portion engaged by a nut member whereby the spindle moves longitudinally with respect to the spaced bores. Such a structure is obviously expensive to produce due to the fit required between the spindle and the bores to obtain accurate straight line movement.

Another prior slide assembly that is used on such a machine tool is a box construction using tapered gibs for removing the shake in the slide system. This produces manufacturing problems because of the need to hold the gibs or scrape them to close tolerances to maintain full contact along their surfaces. This system also must have the tolerance maintained between the hold-downs and the slide to eliminate lateral shaking.

BRIEF DESCRIPTION OF THE INVENTION

The present invention utilizes an elongated slide member having outwardly converging slide surfaces at each side thereof which are supported by vee blocks secured to a base member. The vee blocks at each side of the slide are mounted with respect to the base member to pivot about axes perpendicular to the central longitudinal axis of the converging slide surfaces. The vee blocks at one side of the slide are selectively preloadable to preload the slide member to prevent relative movement between the vee blocks and the slide member.

Accordingly, one object of this invention is to provide a new and improved slide structure.

Another object of this invention is to provide a new and improved method for assembling a slide structure.

Still another object of this invention is to provide a new and improved slide structure in which an elongated slide member is supported between laterally spaced sets of vee blocks with at least one set of such vee blocks being pivotable about an axis essentially perpendicular to the longitudinal slide axis of the slide member.

Another object of this invention is to provide a new and improved method of assembling a slide structure whereby the slide member is preloaded.

Another object of this invention is to provide for assembling a slide structure without requiring any fitting or scraping.

These and other objects of this invention will become more apparent upon consideration of the following detailed description and illustration of a presently preferred embodiment thereof, in which:

FIG. 3 is an exploded perspective view of the slide body and vee blocks as shown in FIGS. 1 and 2.

DESCRIPTION OF THE PRESENTLY PREFERRED EMBODIMENT

Figure 2:
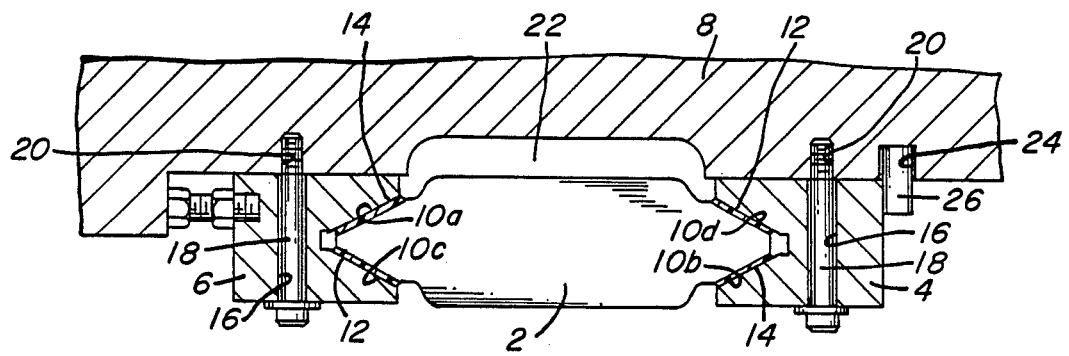
FIG. 2 is a top plan view of the structure shown in FIG. 1.

A slide structure of this invention comprises an elongated formed slide body or slide 2, a plurality of pivotable vee blocks 4 at one side of the slide body 2 and a plurality of pivotal vee blocks 6 at the other side of slide body 2. Vee blocks 4 and 6 are carried by a stationary structure or base 8 and slide 2 slides with reference to the base 8. Base 8 may be a subassembly attachable to a machine or, alternatively, the main stationary frame of a machine (not shown). Inasmuch as the slide structure is the invention of this application, the base 8 is not shown in detail. Slide 2 moves with respect to base 8 and for such purpose slide 2 is provided, at each of its longitudinal sides, with a pair of outwardly converging elongated slide surfaces 10a, b, c and d which are collectively referred to as surfaces 10. Each pair of surfaces 10 converge at an angle so that there is an imaginary apex of such surfaces at each side of slide 2 with each such apex being located on a suitable common longitudinal plane of slide 2 which, as shown, is the central longitudinal plane. The converging pairs of surfaces 10 do not in fact meet at such imaginary apexes. Surfaces 10 are formed to be straight with oppositely located surfaces being parallel. Thus, with respect to FIG. 2, the upper left hand surface 10a is parallel to the lower right hand surface 10b and the lower left hand surface 10c is parallel to the upper right hand surface 10d. With respect to FIG. 2, the surfaces 10a and 10d converge upwardly to an imaginary upper apex and the surfaces 10c and 10b converge downwardly to an imaginary lower apex. Such imaginary apexes of surfaces 10a, 10d and 10c, 10b are located parallel to the lateral plane of slide 2 on which surfaces 10a, b, c and d are located or, alternatively stated, in a common plane perpendicular to the lateral plane of slide 2 containing the lateral apexes of surfaces 10a, 10d and 10c, 10b.

Slide 2 is preferably formed from a suitable cast iron material; however, any suitable rigid material may be used for slide 2. Base 8 is also formed from any suitable rigid material such as cast iron or steel.

Figure 1:
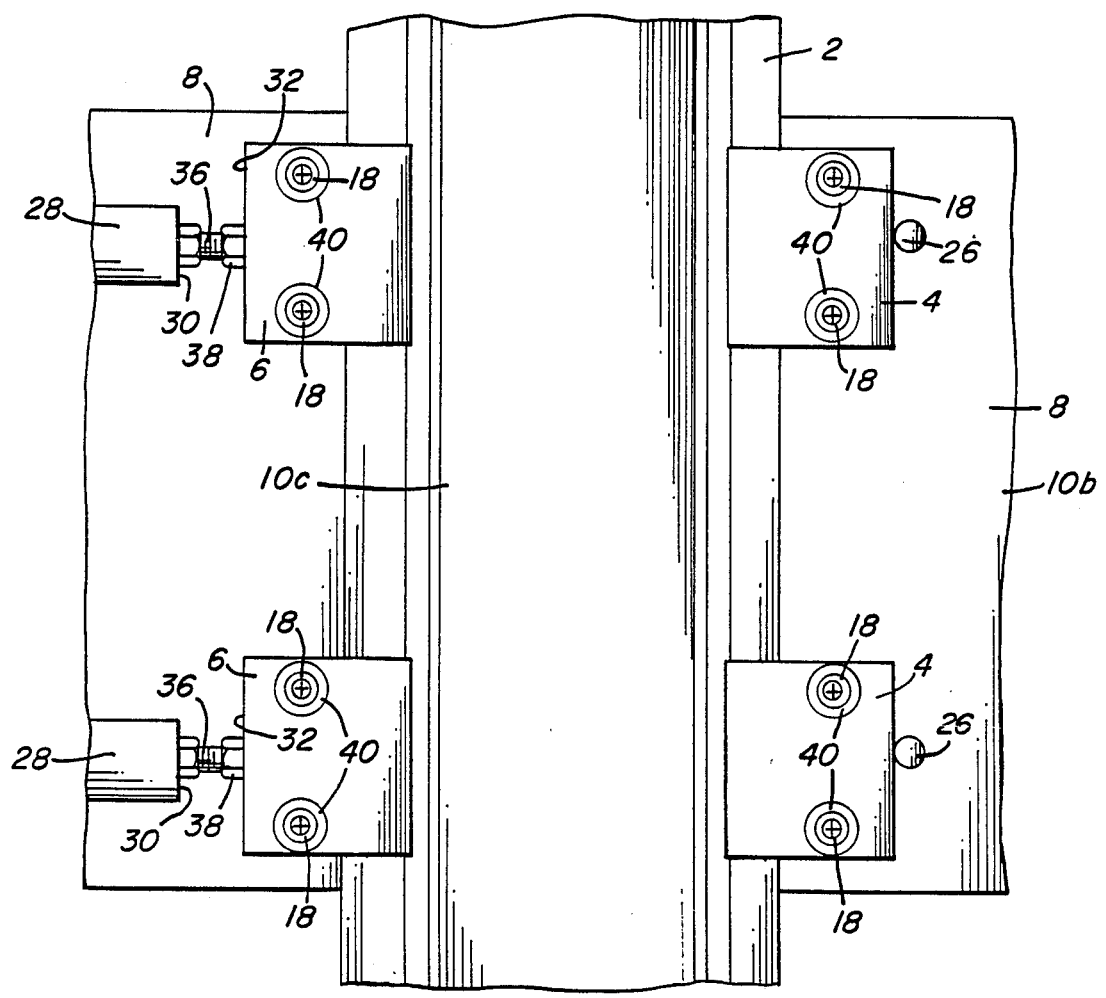
FIG. 1 is a front plan view of a slide structure constructed in accordance with the principles of this invention.

Vee blocks 4 and 6 form an opening each of which is provided with inwardly converging surfaces 12 to each of which a suitable low friction material is secured to provide slideways 14. Vee blocks 4 and 6 support slide 2 and each block is provided with a pair of vertically spaced lateral through bores 16 through which suitable machine or cap screws 18 freely pass, respectively. Bores 16 are sized to permit a desired limited degree of pivotal movement of blocks 4 and 6 relative to screws 18. Base 8 is provided with vertically spaced threaded bores 20 to threadedly receive the inner threaded ends of screws 18. With respect to FIG. 1, the blocks 4 are secured to the base 8 adjacent the right side of slide 2 and the blocks 6 are secured to the base 8 adjacent the left side of slide 2. Bores 20 at the sides of slide 2 are located along vertical axes, respectively and bores 16 are of a size that the blocks 4 and 6 can move relative to the elongated body portions of screws 18 whereby the blocks 4 and 6 can pivot relative to the slide 2. It is to be realized that the pivotable movement of blocks 4 and 6 is through a limited range as selected in the sizing of screws 18 and bores 16. Base 8 is formed to provide a space 22 adjacent slide 2 to insure that base 8 does not interfere with the movement of slide 2. Thus, the portions of base 8 engaged by the blocks 4 and 6 form a reference plane with respect to which the slide 2 slides. The engagement of blocks 4 and 6 with base 8 is, as shown, on a common reference plane. Base 8 is also provided with two vertically spaced bores 24 for suitably rigidly receiving pivot pins 26 therein, respectively. For example, pins 26 can be pressed into bores 24 via a suitable press fit as is known. Pins 26 are located (with respect to FIG. 1) to engage the outermost right side surface of blocks 4 located outwardly of slide 2 essentially midway between the central axes of screws 18. Vee blocks 6 are located laterally opposite blocks 4 and are supported with reference to support 8 by screws 18. Base 8 is provided with a pair of integral vertically spaced rigid abutments 28 which are located laterally outwardly of blocks 6 at the midpoint between the central axes of screws 18. Abutments 28 have, with reference to FIG. 1, vertically extending surfaces 30 spaced laterally outwardly from vertically extending outermost left side surfaces 32 of blocks 6. Blocks 6 are each provided with an elongated threaded bore 34 which extends perpendicularly from surface 32. Bore 34 is also located vertically intermediate the axes of the bores 16 in blocks 6 through which the screws 18 pass. Bores 34 are threaded to receive the threaded ends of jack screws 36, respectively. Jack screws 36 extend outwardly from blocks 6 with the head portions thereof engaging the outer abutment surface 30 of abutments 20 adjacent thereto, respectively. The threaded portion of each screw 36 carries a nut 38 to permit blocks 6 to be locked in position with respect to abutments 20 and blocks 6. The outer surface of the heads of jack screws 36 are formed to permit the jack screws 36 to pivot with respect to surfaces 30.

The slideways 14 of blocks 4 engage surfaces 10d and 10b, respectively, and have an imaginary apex essentially on (with respect to FIG. 1) the central longitudinal plane of slide 2. Slideways 14 of blocks 6 engage surfaces 10a and 10c, respectively, and also have an imaginary apex essentially on the central longitudinal plane of slide 2. With such construction the surfaces 10a and 10c are supported between spaced pairs of slideways 14 on blocks 6 and the surfaces 10b and 10d are supported between spaced pairs of slideways 14 on blocks 4. For this invention slideways 14 are formed in any suitable low friction manner from any suitable material having the characteristics as described herein. One such material for slideways 14 is sold under the term TURCITE by W. S. Shamban and Co., 711 Mitchell Road, P. O. Box 665, Newbury Park, Calif. 91320. Such TURCITE material is supplied in flat stock and is attached to the surfaces 12 of vee blocks 4 and 6 by a suitable adhesive or cement such as that obtained from the supplier of the TURCITE material. Another suitable low friction material for slideways 14 is sold under the term MOGLICE by Diamont Kitte Schulz and Co., P. 0. Box 70, D4050 Monchengladback, West Germany. Such MOGLICE material is injected between the surfaces 10 and surfaces 12. A suitable release agent is applied to the surfaces 10 of slide 2 to insure that the MOGLICE will not adhere or stick to surfaces 10.

With the structure heretofore described the slide structure is assembled in the following manner. Initially one pair of similar blocks, normally the right hand blocks 4, are loosely secured to base 8 by screws 18 engaging threaded bores 20. Thereafter the surfaces 10b and 10d of slide 2 are inserted into blocks 4 and into engagement with slideways 14 of blocks 4 to permit the blocks 4 to support the right side of slide 2. Blocks 6 are then slipped over the left side of surfaces 10a and 10c of slide 2 with the slideways 14 of blocks 6 engaging surfaces 10a and 10c. Thereafter the blocks 6 are loosely anchored to base 8 via screws 18 engaging bores 20. When so installed blocks 6 threadedly carry jack screws 36 with nuts 38 attached. When such assembly is completed slide 2 is supported by engagement with the slideways 14 of blocks 4 and 6 with the blocks 4 and 6 being free to pivot with respect to the base 8. After blocks 4 and 6 are so located all screws 18 are anchored to base 8 under light loading by means of spring washers 40 located between the heads of screws 18 and the blocks 4 and 6. Spring washers 40 have a spring characteristic as desired to obtain the initial loading of screws 18 whereby the blocks 4 and 6 are secured with respect to base 8, but blocks 4 and 6 can move relative to base 8. The slideways 14 of blocks 6 are initially moved into engagement with surfaces 10a and 10c and the surfaces 10b and 10d are moved into engagement with slideways 14 of blocks 4. Such engagement removes all the slack between the blocks 4, 6 and slide 2. Thereafter jack screws 36 are further adjusted to additionally force blocks 6 towards blocks 4 whereby a lateral preload exists between blocks 4, 6 and slide 2. Slide 2 is preloaded to a pressure at the interface between the blocks 4, 6 and slide 2 (that is, surfaces 10 with slideways 14) whereby the slide 2 is supported for relative movement with minimum lateral deviation. Once slide 2 is properly preloaded the screws 18 are anchored to base 8 to maintain the applied preload. Thus, when assembling the slide structure the slide 2 is initially supported for vertical movement within the blocks 4 and 6.

Prior to the anchoring of blocks 4 and 6, the slide 2 is reciprocated within the blocks 4 and 6 with the surfaces 10 sliding over the slideways 14 such that, when repeated to a sufficient degree, the slide 2 is "worn" in with respect to the slideways 14 of blocks 4 and 6. During such wearing in process the blocks 4 and 6 are free to pivot such that the slideways 14 of blocks 4 and 6 adjust or wear into a position established by the reciprocating slide 2. Since the slideways 14 are soft, relative to the surfaces 10, the wearing in of the slideways 14 will compensate for any minor irregularities in or in the location of the surfaces 10 relative to the slideways 14. Thus, with the described structure and method of assembly the slide 2 establishes the straight line path of motion of the structure. In particular, it is not necessary to machine cooperable engagable surfaces on the slide 2 and the blocks 4 and 6 to obtain straight line movement of the slide 2 relative to base 8. After the relative straight line path of movement between slide 2 and base 8 is established the slide 2 is preloaded as described for subsequent operation.

The above description of the slide 2 with vertical movement is with relation to the illustrative drawings and only for the sake of convenience in description. The base 8 can be located to extend in any desired direction. The reference plane of base 8 engaged by the blocks 4 and 6 can be of any desired configuration; however, the planar reference plane described is preferred. With the preferred structure described the surfaces 10 and slideways 14 establish a central slide plane essentially parallel to the reference plane of the base 8. The structure of FIG. 3 illustrates that the slide 2 can be moved by selectively energizable drive means. More specifically, FIG. 3 illustrates an electrical drive motor 25 which drives slide 2, through a suitable gear box 27 carried by a plate 29, upwardly and downwardly in cooperation with a threaded anchor bolt 31. Plate 29 is suitably rigidly secured to base 8 and motor 25 is energized through suitable electrical controls (not shown). Inasmuch as such drive systems are known, further description thereof is not necessary for an understanding of this invention to one skilled in the relevant art. It is sufficient to realize that the drive is reversible such that, upon proper control, the drive reciprocates the slide 2 relative to base 8.

It is obvious that the accuracy of surfaces 10 and slideways 14, as relative planar surfaces, the location of blocks 4 and 6, jack screws 28, pivot pins 18, etc. will effect the accuracy of the straight line movement of slide 2 relative to base 8. Accordingly, the various components of the above described structure are formed or located so as to be as symmetrical as is desired with respect to the vertical centerline of travel of the slide 2. All spacings and supports of the blocks 4 and 6 are preferably symmetrical to obtain accurate and repeatable straight line motion of slide 2 over base 8. The structure and method of this invention are applicable to a wide variety of structures; however, the same degree of accuracy of relative movement is not required for all applications of this invention. The structure and method of this invention are, however, particularly suited for highly accurate relative straight line movement.

Having described a preferred embodiment of this invention in accordance with the Patent Statutes, those skilled in the relevant art will be cognizant of the fact that modifications can be made to the described structure without departing from the spirit and scope of this invention. Accordingly, the following claims are to be construed as including modifications of the structures defined herein as would be known to those skilled in the relevant art.

Although the surfaces 10 are shown and described as outwardly converging, any suitable configuration may be utilized for surfaces 10. Also, although wearing-in is described, it is not essential that such wearing-in occur.

I claim:

1. A linear slide structure comprising:
   a base member, an elongated slide member having a pair of outwardly converging surfaces at each side thereof, respectively;
   lockable, pivotable support members carried by said base member and cooperable with said surfaces respectively, to support said slide member for linear movement with respect to said base member and pivotable with respect to the longitudinal axis of linear movement of said slide member about axes in a plane perpendicular to said longitudinal axis; and
   at least one of said support members being selectively movable laterally of the longitudinal axis of linear movement of said slide member to provide a preload on said slide member whereby said slide member is preloaded and said support members are locked to maintain said preload to support said slide member for relative linear movement with minimum lateral deviation.

2. A linear slide member as defined in claim 1 wherein said base member has an abutment portion located laterally outwardly from the support members at one side of said slide member, and said support members at said one side carry adjustable means cooperable with said abutment portion to bias said support members at said one side into engagement with said slide member.

3. A linear slide structure as defined in claim 1 wherein said support members include slideways of a low coefficient of friction material engagable with said surfaces, respectively.

4. A linear slide member as set forth in claim 1 wherein said support members comprise a pair of support members at each side of said slide member.

5. A linear slide member as set forth in claim 1 wherein said pairs of converging surfaces converge at the same angle.

6. A linear slide member as set forth in claim 1 wherein said pivotable movement is permitted by means of openings in said block members surrounding a screw shank of smaller cross section.

* * * * *